United States Patent
Nirantare et al.

(10) Patent No.: US 9,590,525 B2
(45) Date of Patent: Mar. 7, 2017

(54) WIRELESS POWER TRANSFER SYSTEMS USING LOAD FEEDBACK

(71) Applicant: Eaton Capital, Dublin (IE)

(72) Inventors: Prasanna Sharadchandra Nirantare, Pun (IN); Birger Pahl, Milwaukee, WI (US); Milind Suresh Kothekar, Dombivli (IN)

(73) Assignee: Eaton Capital (IE)

( * ) Notice: Subject to any disclaimer, the term of this patent is extended or adjusted under 35 U.S.C. 154(b) by 148 days.

(21) Appl. No.: 14/323,436

(22) Filed: Jul. 3, 2014

(65) Prior Publication Data

US 2016/0006356 A1    Jan. 7, 2016

(51) Int. Cl.
*H02M 7/23* (2006.01)
*H02M 7/219* (2006.01)
*H02J 5/00* (2016.01)
*H02J 7/02* (2016.01)
*H02J 17/00* (2006.01)

(Continued)

(52) U.S. Cl.
CPC ............. *H02M 7/219* (2013.01); *H02J 5/005* (2013.01); *H02J 7/025* (2013.01); *H02J 17/00* (2013.01); *H02M 7/06* (2013.01); *H02J 3/1842* (2013.01); *H02J 50/12* (2016.02); *H02M 1/12* (2013.01); *H02M 1/4233* (2013.01); *H02M 7/23* (2013.01); *H02M 2001/008* (2013.01); *H02M 2001/0058* (2013.01); *H02M 2001/4283* (2013.01); *Y02B 70/126* (2013.01); *Y02B 70/1441* (2013.01); *Y02B 70/1491* (2013.01)

(58) Field of Classification Search
CPC ......... H02M 2001/4283; H02M 7/219; H02M 7/23; H02J 3/1842; H02J 50/12; H02J 50/00; H02J 3/1821
See application file for complete search history.

(56) References Cited

U.S. PATENT DOCUMENTS

| | | | |
|---|---|---|---|
| 2,568,169 A | 9/1951 | Raczynski | |
| 3,484,727 A | 12/1969 | Weber et al. | |

(Continued)

FOREIGN PATENT DOCUMENTS

| | | |
|---|---|---|
| CN | 202309183 U | 7/2012 |
| CN | 202444333 U | 9/2012 |

(Continued)

OTHER PUBLICATIONS

International Search Report and Written Opinion Corresponding to International Application No. PCT/IB2015/055004; Date of Mailing: Sep. 15, 2015; 9 Pages.

(Continued)

*Primary Examiner* — Harry Behm
(74) *Attorney, Agent, or Firm* — Ward and Smith, P.A.

(57) ABSTRACT

A system includes an AC input port configured to be coupled to an AC power source, a first AC/DC converter circuit having a first port coupled to the AC input port, and a first resonant circuit coupled to the first port of the first AC/DC converter circuit. The system further includes a second resonant circuit inductively coupled to the first resonant circuit, a second AC/DC converter circuit coupled to the second resonant circuit and a control circuit configured to control the first AC/DC converter circuit responsive to an output of the second AC/DC converter circuit.

20 Claims, 6 Drawing Sheets

(51) Int. Cl.
*H02M 7/06* (2006.01)
*H02J 3/18* (2006.01)
*H02M 1/42* (2007.01)
*H02M 1/12* (2006.01)
*H02M 1/00* (2006.01)

(56) References Cited

U.S. PATENT DOCUMENTS

| | | |
|---|---|---|
| 4,471,335 A | 9/1984 | Moritz et al. |
| 6,060,875 A | 5/2000 | Capici et al. |
| 6,198,375 B1 | 3/2001 | Shafer |
| 7,411,479 B2 | 8/2008 | Baarman et al. |
| 7,495,414 B2 | 2/2009 | Hui |
| 7,554,430 B2 | 6/2009 | Mehrotra et al. |
| 7,639,110 B2 | 12/2009 | Baarman et al. |
| 8,138,875 B2 | 3/2012 | Baarman et al. |
| 8,380,998 B2 | 2/2013 | Azancot et al. |
| 8,531,059 B2 | 9/2013 | Ichikawa et al. |
| 8,669,678 B2 | 3/2014 | Urano |
| 8,698,350 B2 | 4/2014 | Kanno |
| 2006/0049907 A1 | 3/2006 | Liu |
| 2007/0007935 A1 | 1/2007 | Johnson |
| 2011/0049997 A1 | 3/2011 | Urano |
| 2011/0080053 A1 | 4/2011 | Urano |
| 2011/0127846 A1 | 6/2011 | Urano |
| 2011/0163542 A1 | 7/2011 | Farkas |
| 2011/0304216 A1* | 12/2011 | Baarman ............. H02J 17/00 307/104 |
| 2012/0043825 A1 | 2/2012 | Urano |
| 2012/0086281 A1 | 4/2012 | Kanno |
| 2012/0112719 A1 | 5/2012 | Xia et al. |
| 2012/0193993 A1 | 8/2012 | Azancot et al. |
| 2012/0212068 A1 | 8/2012 | Urano |
| 2012/0280575 A1 | 11/2012 | Kim et al. |
| 2012/0293118 A1 | 11/2012 | Kim et al. |
| 2012/0294045 A1 | 11/2012 | Fornage et al. |
| 2013/0033117 A1 | 2/2013 | Kim et al. |
| 2013/0187625 A1 | 7/2013 | Mao |
| 2013/0249304 A1 | 9/2013 | Keeling et al. |
| 2013/0249479 A1 | 9/2013 | Partovi |
| 2014/0049118 A1 | 2/2014 | Karalis et al. |
| 2014/0183967 A1 | 7/2014 | Ryu et al. |
| 2014/0203657 A1* | 7/2014 | Song .................. H02J 50/12 307/104 |
| 2015/0188446 A1 | 7/2015 | Wu et al. |
| 2015/0280455 A1* | 10/2015 | Bosshard ............ H02J 5/005 307/104 |
| 2016/0001662 A1* | 1/2016 | Miller ................ B60L 11/005 307/104 |

FOREIGN PATENT DOCUMENTS

| | | |
|---|---|---|
| GB | 1134208 | 2/1966 |
| IN | 201203404 P4 | 8/2013 |
| JP | 2006-271027 A | 10/2006 |
| WO | WO 0225677 A2 | 3/2002 |
| WO | WO 2012/046453 A1 | 4/2012 |
| WO | WO 2013/111243 A1 | 8/2013 |

OTHER PUBLICATIONS

International Search Report and Written Opinion Corresponding to International Application No. PCT/US2014/072667; Date of Mailing: Mar. 25, 2015; 9 Pages.

Chen, Qingbin et al., "The New Electric Shielding Scheme with Comb-shaped Wire and its Applications in SMPS"; College of Electrical Engineering and Automation; Fuzhou University; Fuzhou, Fujian, 350108, China; Published in: Telecommunications Energy (INTELEC), 2011 IEEE 33rd International Conference; Oct. 9-13, 2011; ISSN: 21585210; 7 pages.

U.S. Appl. No. 14/323,436 entitled "Wireless Power Transfer Systems Using Load Feedback" filed Jul. 3, 2014.

Braun Toothbrush Teardown, Published on May 29, 2012, EEVblog #284, Retrieved from the internet at URL https://www.youtube.com/watch?v=JJgKfTW53uo.

Duong et al. "Experimental Results of High-Efficiency Resonant Coupling Wireless Power Transfer Using a Variable Coupling Method", *IEEE Microwave and Wireless Components Letters*, vol. 21, No. 8, Aug. 2011, 3 pages.

Nair et al. "Efficiency Enhanced Magnetic Resonance Wireless Power Transfer System and High Voltage Integrated Chip Power Recovery Scheme", *IEEE Conecct 2014*, Jan. 6-7, 2014.

International Search Report and Written Opinion Corresponding to International Application No. PCT/US2015/066406; Date of Mailing: Mar. 9, 2016; 11 Pages.

* cited by examiner

Time

Time

WIRELESS POWER TRANSFER SYSTEMS USING LOAD FEEDBACK

BACKGROUND

The inventive subject matter relates to electrical power transfer apparatus and methods and, more particularly, to wireless power transfer apparatus and methods.

Wireless power transfer systems have been developed for a variety of different applications, including battery charging applications for vehicles, mobile electronic devices, tools, vehicles, and the like. Such systems commonly use magnetically coupled resonant circuits to transfer energy. Examples of such wireless power transfer systems are described in U.S. Pat. No. 8,531,059 and U.S. Patent Application Publication No. 2013/0249479.

U.S. patent application Ser. No. 14/143,505 entitled METHODS, CIRCUITS AND ARTICLES OF MANUFACTURE FOR CONFIGURING DC OUTPUT FILTER CIRCUITS, filed Dec. 30, 2013 and published as U.S. Patent Application Publication No. 2015/0188446, describes wireless power transfer systems having a transmitter including a rectifier that receives power from an AC power source, an inverter circuit that generates a higher frequency AC output voltage from a DC output produced by the rectifier, and a first resonant circuit coupled to an output of the inverter circuit. A receiver includes a second resonant circuit including a coil that is configured to be placed in close proximity to a coil of the first resonant circuit and a rectifier circuit that produces a DC output from an AC output produced by the second resonant circuit.

SUMMARY

Some embodiments of the inventive subject matter provide a system including an AC input port configured to be coupled to an AC power source, a first AC/DC converter circuit having a first port coupled to the AC input port, and a first resonant circuit coupled to the first port of the first AC/DC converter circuit. The system further includes a second resonant circuit inductively coupled to the first resonant circuit, a second AC/DC converter circuit coupled to the second resonant circuit and a control circuit configured to control the first AC/DC converter, circuit responsive to an output of the second AC/DC converter circuit.

In some embodiments, the first AC/DC converter circuit may include an H-bridge circuit. The H-bridge circuit may include first and second half-bridge circuits, each comprising first and second switches coupled in series between first and second buses, and the first resonant circuit may be coupled to respective first and second nodes between the first and second switches of respective ones of the first and second half-bridge circuits. The system may further include at least one inductor coupled between the AC input port and at least one of the first and second nodes. The second AC/DC converter circuit may include a diode bridge circuit.

In some embodiments, the control circuit may be configured to control a current at the AC input port responsive to an output (e.g., voltage, current, power, energy, etc.) produced by the second AC/DC converter circuit. The control circuit may be further configured to control the current at the AC input port responsive to a voltage at the AC input port to support, for example, power factor correction or harmonic compensation. An energy storage circuit (e.g., at least one capacitor) may be coupled to a second port of the first AC/DC converter circuit.

In further embodiments, the system may include a communications circuit configured to transmit a signal representative of the output of the second AC/DC converter circuit. The control circuit may be configured to receive the transmitted signal and to control the first AC/DC converter circuit responsive to the received signal.

Further embodiments of the inventive subject matter provide a wireless power transfer apparatus including an AC input port configured to be coupled to an AC power source, a converter circuit having first port coupled to the AC input port, an energy storage circuit coupled to a second port of the converter circuit, and a resonant circuit coupled to the first port of the converter circuit and configured to inductively transfer power to an external device. The apparatus further includes a control circuit configured to control the converter circuit responsive to a signal indicative of a state of the external device.

In some embodiments, the converter circuit may include an AC/DC converter circuit. For example, the converter circuit may include an active rectifier circuit. The active rectifier circuit may include an H-bridge rectifier circuit including first and second half-bridge circuits, each comprising first and second switches coupled in series between first and second buses. The first port of the converter circuit may include respective first and second nodes between the first and second switches of respective ones of the first and second half-bridge circuits. The apparatus may further include at least one inductor coupled between the AC input port and at least one of the first and second nodes.

In some embodiments, the control circuit may be configured to control a current at the AC input port responsive to a signal indicative of a voltage produced by the external device. The control circuit may be configured to receive a communications signal representative of the voltage produced by the external device and to control the converter circuit responsive to the received communications signal. The control circuit may be further configured to control the current at the AC input port responsive to a voltage at the AC input port.

The resonant circuit may include a first resonant circuit, and the apparatus may further include a receiver unit having an output configured to be coupled to a load and comprising a second resonant circuit configured to be inductively coupled to the first resonant circuit. The converter circuit may include a first converter circuit, the receiver unit may include a second converter circuit coupled to the second resonant circuit, and the control circuit may be configured to control the first converter circuit responsive to an output of the second converter circuit. For example, the control circuit may be configured to control a current at the AC input port responsive to an output voltage at the load.

DETAILED DESCRIPTION

Figure 1:
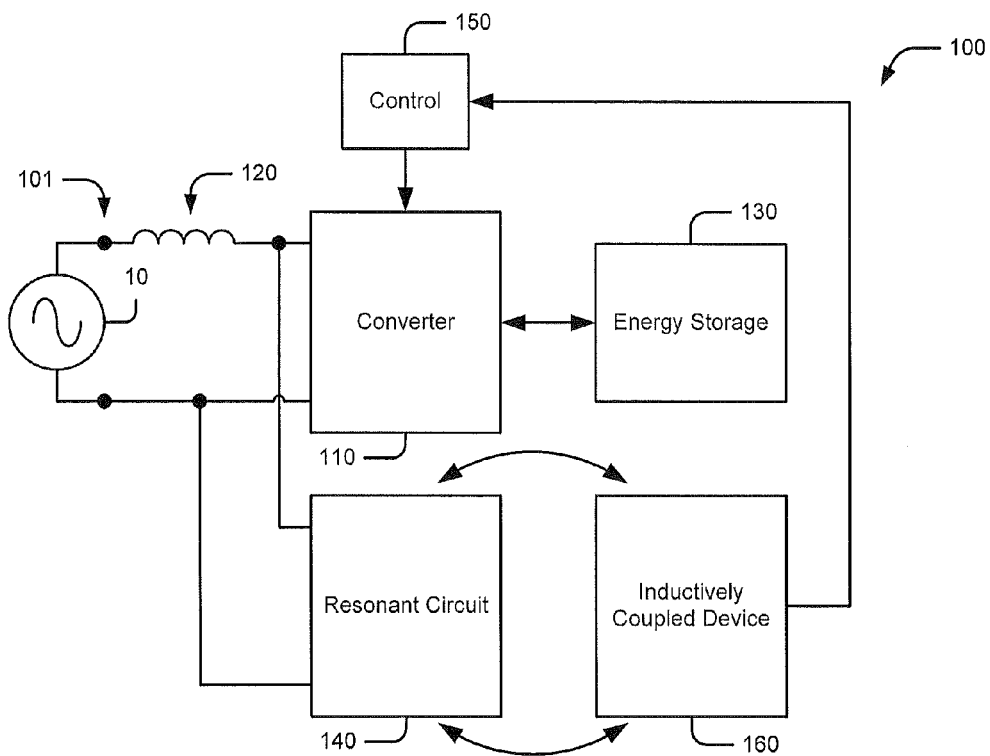
FIG. 1 is a schematic diagram illustrating a system according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates a system 100 according to some embodiments of the inventive subject matter. The system includes an input port 101 configured to be coupled to an AC power source 10. A converter circuit 110 has a first port coupled to the input port 101 via an impedance network 120, here shown as at least one inductor L.

The system 100 also includes a resonant circuit 140, which is coupled to the first port of the converter circuit 110 and is inductively coupled to an inductively coupled device 160. The system 100 further includes a control circuit 150, which is configured to control the converter circuit 110 responsive to a state of the inductively coupled device 160. For example, in some embodiments described below, the inductively coupled device 160 may include a resonant circuit and converter that are used to provide power to a load, and the state of the inductively coupled device 160 may be, for example, an output voltage provided to the load. However, it will be appreciated that other embodiments may control the converter circuit 110 using other parameters transmitted from a device inductively coupled thereto.

It will be appreciated that, generally, the system 100 may comprise any of a number of different types of circuitry. For example, the converter circuit 110 may include power semiconductor devices, such as insulated gate bipolar transistors (IGBTs) and/or power MOSFET devices, along with other components used to bias and/or drive such devices. The control circuit 150 may include analog and/or digital circuitry, such as a microcontroller or other computing device and various analog and/or digital circuits for interfacing such a device to the converter circuit 110 and the inductively coupled device 160. The resonant circuit 140 may include any of a number of different types of circuit components, including, but not limited to, inductors, capacitors and resistors. The inductively coupled device 160 may comprise any of a variety of devices configured to be inductively coupled to the resonant circuit 140 for power transfer therebetween. Such devices may include, for example, battery chargers, mobile computing and communications devices, vehicle battery charging systems, and the like.

Figure 2:
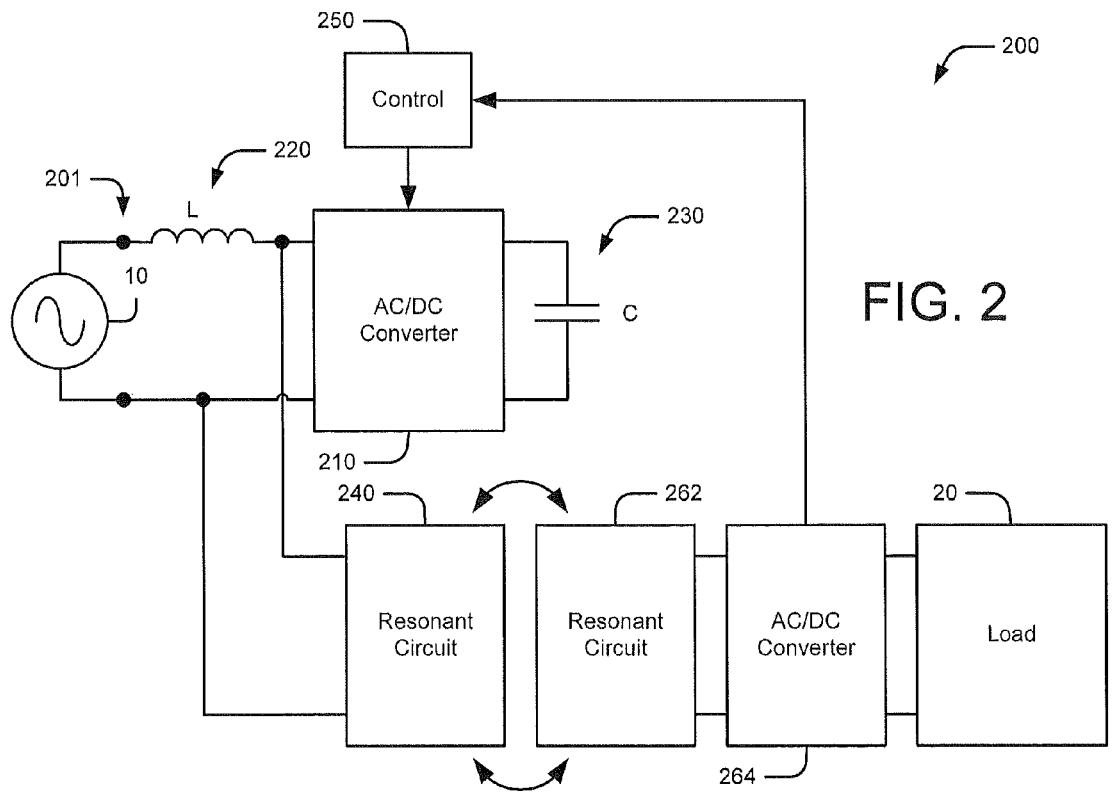
FIG. 2 is a schematic diagram illustrating a system according to further embodiments of the inventive subject matter.

FIG. 2 illustrates a system 200 according to further embodiments. The system 200 includes an input port 201 configured to be coupled to an AC power source 10. A first AC/DC converter circuit 210 has a first port coupled to the input port 201 via an impedance network 220, here shown as including at least one inductor L. The first AC/DC converter circuit 210 has a second port coupled to an energy storage device, here illustrated as at least one capacitor 230.

The system 200 further includes a first resonant circuit 240 coupled to the first port of the first AC/DC converter circuit 210 and inductively coupled to a second resonant circuit 262. A second AC/DC converter circuit 264 has a first port coupled to the second resonant circuit 262 and a second port configured to be coupled to a load 20. A control circuit 250 controls the first AC/DC converter circuit 210 responsive to a state (e.g., output) of the second AC/DC converter circuit 264. For example, the control circuit 250 may control the first AC/DC converter circuit 210 responsive to an output provided to the load 20 to maintain the output to the load 20 at a desired state. The output may include, for example, a voltage, current, power, energy and/or other quantity.

In some embodiments, the first AC/DC converter circuit 210 may include an active rectifier circuit and the second AC/DC converter circuit may comprise a passive rectifier. The control circuit 250 may control the active rectifier to provide a desired output voltage from the passive rectifier to the load 20. Information pertaining to the output voltage produced at the load 20 may be conveyed to the control circuit 250 in any of a number of different ways including, e.g., by analog and/or digital signals. In some embodiments, the control circuit 250 may further control the active rectifier to control a current at the input port 201, e.g., to control power factor, harmonics or other characteristics.

Figure 3:
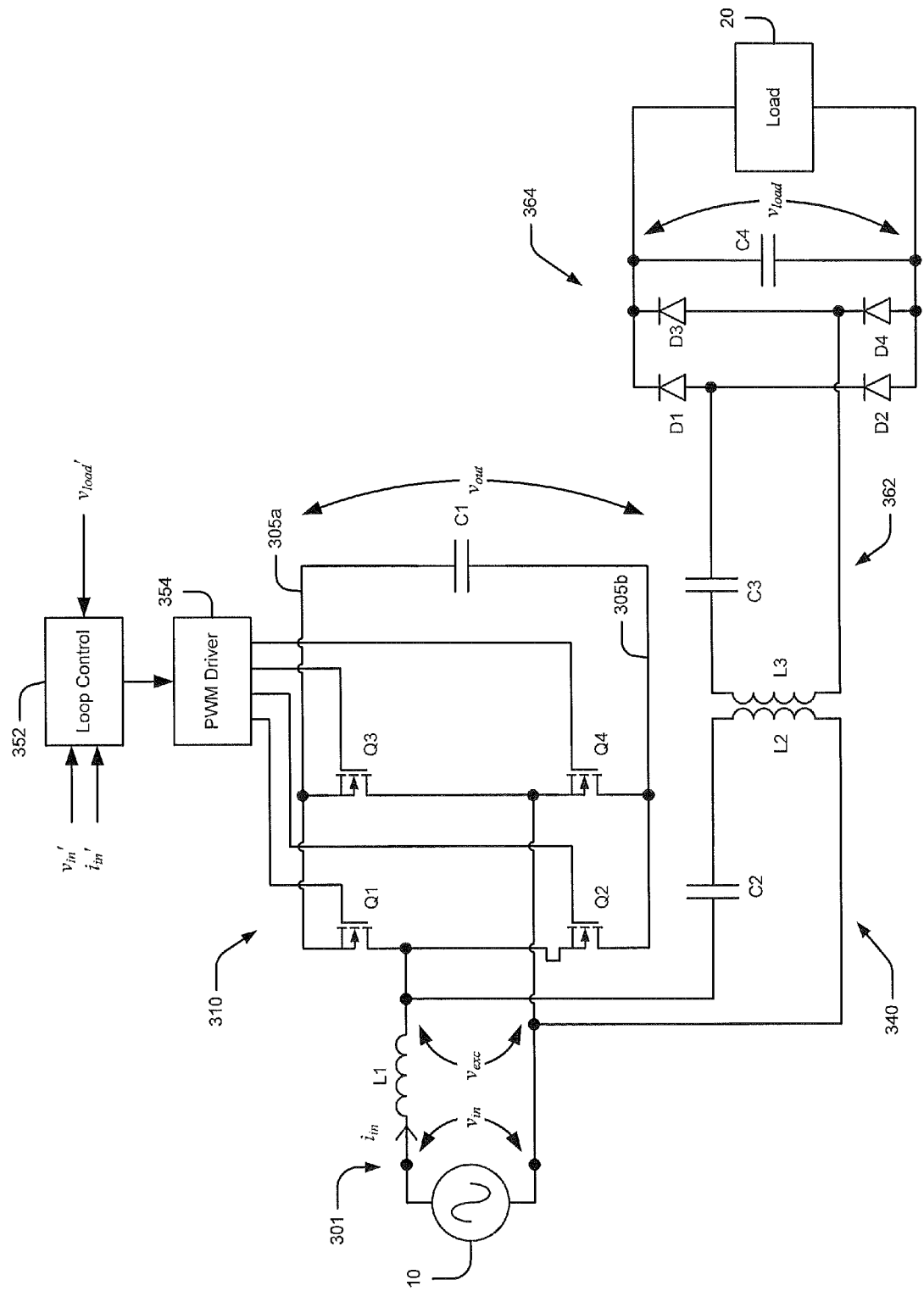
FIG. 3 is a schematic diagram illustrating a system including an active bridge input converter and a diode bridge output converter according to some embodiments of the inventive subject matter.

FIG. 3 illustrates a system 300 with such an arrangement according to further embodiments. The system 300 includes an input port 301 configured to be coupled to an AC power source 10. An active bridge circuit 310 is coupled to the input port 301 via at least one inductor L1. The active bridge circuit 310 comprises an H-bridge coupled between first and second DC buses 305a, 305b that includes a first half-bridge leg with two serially-connected transistors Q1, Q2 and a second half-bridge leg with two serially-connected transistors Q3, Q4. The first and second DC buses 305a, 305b are coupled to at least one energy storage capacitor C1, across which a voltage $v_{out}$ is produced. A first node between the transistors Q1, Q2 and a second node between the transistors Q3, Q4 are coupled to the input port 301.

The system 300 also includes a first resonant circuit 340 coupled to the input port of the active bridge circuit 310 and including a capacitor C2 and an inductor L2. The first resonant circuit 340 is excited by the operation of the transistors Q1-Q4 of the active bridge circuit 310, which produce an excitation voltage $v_{exc}$ at the input of the active bridge circuit 310. A second resonant circuit 362 includes an inductor L3 and a capacitor C3 and, when the inductor L3 of the second resonant circuit 362 is in near-field proximity to the inductor L2 of the first resonant circuit 340, the second resonant circuit 362 may receive energy from the first resonant circuit 340 via a resonant inductive transfer. Magnetic coupling of the inductors L2, L3 of the first and second resonant circuits 340, 362 may occur via an air interface (air core) or may utilize magnetic flux-directing components, e.g., one or more masses of magnetic material positioned to enhance inductive transfer between the first and second resonant circuits 340, 362.

The second resonant circuit 362 is coupled to a diode bridge circuit 364 including diodes D1-D4. The diode bridge circuit 364 produces a DC output voltage $v_{load}$ across a load 20 responsive to an AC excitation of the second resonant circuit 362. A capacitor C4 may be provided at the output of the diode bridge circuit 364 for energy storage.

A closed loop control circuit 352 and a pulse-width modulation (PWM) driver circuit 354 control the active bridge circuit 310. In particular, the closed loop control circuit 352 may generate a PWM control signal for the PWM driver circuit 354 responsive to a signal $v_{load}'$ representing the output voltage $v_{load}$ at the load 20, a signal $i_{in}'$ representing a current $i_{in}$ at the input port 301 and a signal $v_{in}'$ representing a voltage $v_{in}$ at the input port 301. In some embodiments, for example, the closed loop control circuit 352 and the PWM driver circuit 352 may operate the switching transistors Q1-Q4 at a relatively high frequency (e.g. 100-200 kHz) in comparison to the frequency of the AC input voltage from the AC source 10, with a pulse width that is modulated to control currents passing therethrough. This provides an excitation to the first resonant circuit 340 at the switching frequency while controlling power transfer to the second resonant circuit 362.

The closed loop control circuit 352 may be implemented using any of a number of different types of circuitry. For example, the closed loop control circuit 352 may be implemented using a microcontroller or similar computing device, along with ancillary circuitry for interfacing such a device to peripheral circuitry, such as the PWM driver circuit 354 and/or sensors and other devices. It will be appreciated that some embodiments may use analog control circuitry to similar effect. The PWM driver circuit 354 may include, for example, analog and digital circuitry configured to generate appropriate signals to drive the transistors Q1-Q4 of the active bridge circuit 310 based on a control input provided by the closed loop control circuit 352.

The arrangement illustrated in FIG. 3 may provide several advantages in comparison to conventional wireless power transfer systems. In particular, coupling the first resonant circuit 340 to the input of the active bridge circuit 310 eliminates the need for an additional inverter to drive a transmitting resonant circuit. This can reduce parts count and cost in comparison to some conventional systems.

Figure 4:
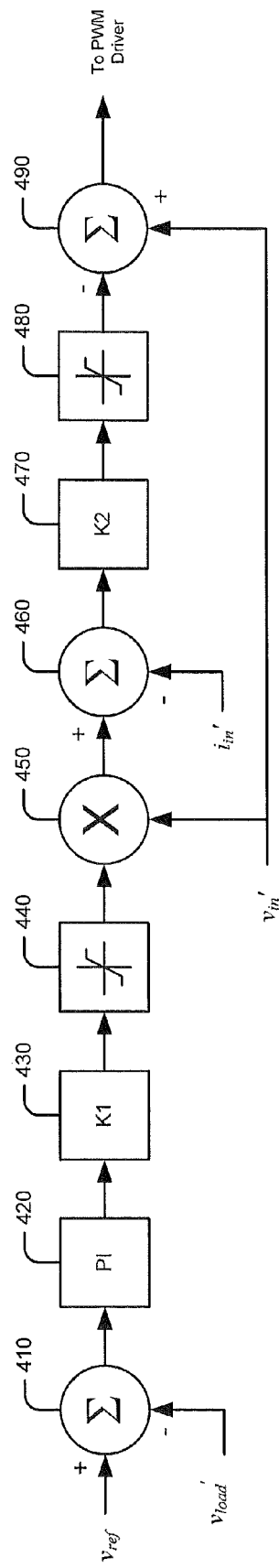
FIG. 4 is a block diagram illustrating an example of a control architecture for the system of FIG. 3 according to further embodiments of the inventive subject matter.

FIG. 4 illustrates a control architecture that may be implemented by the closed loop control circuit 352. At a summing junction 410 of an outer voltage control loop, the load voltage signal $v_{load}'$ may be compared with a reference voltage signal $v_{ref}$ representing a desired voltage to be provided to the load 20, generating an error signal that is provided to a first compensator including a proportional integrator 420, gain 430 and limiter 440. The output of the first compensator is provided to a multiplier 450, which multiplies the output of the first compensator by the input voltage signal $v_{in}'$ to produce a command signal for an inner current control loop. In the inner current control loop, this command signal is compared with the input current signal $i_{in}'$ at a summing junction 460, producing an error signal that is provided to a second compensator including a gain 470 and a limiter 480. The output of the second compensator is provided to another summing junction 490, which adds the compensator output to the input voltage signal $v_{in}'$ to produce a command signal for a PWM driver.

Figure 5:
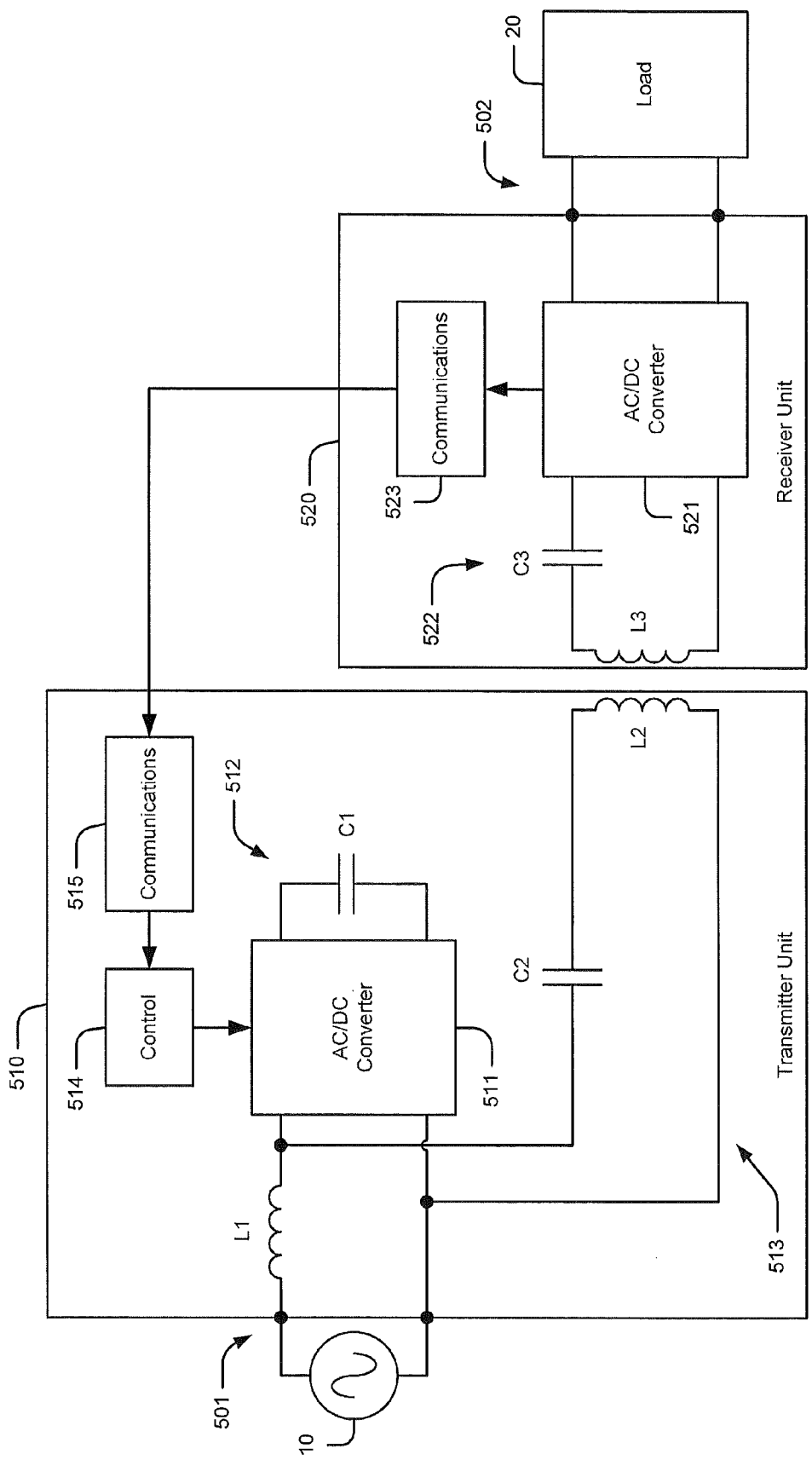
FIG. 5 is a schematic diagram illustrating a wireless power transfer system according to some embodiments of the inventive subject matter.

Inductive power transfer systems according to some embodiments may be used in a number of different applications. For example, FIG. 5 illustrates an exemplary configuration for applications such as mobile device charging or vehicle charging. A transmitter unit 510 may have an input port 501 configured to be coupled to an AC power source 10. The transmitter unit 510 includes a first AC/DC converter circuit 511 having a first port coupled to the input port 501 by an inductor L1 and a second port coupled to an energy storage capacitor C1. A first resonant circuit 513 is coupled to the input port of the first AC/DC converter circuit 511 and includes an inductor L2 and a capacitor C2. The inductor L1 may comprise, for example, a conductor loop or similar structure configured to facilitate inductive (near-field) transmission to an external device.

A receiver unit 520 may be configured to receive power from the transmitter unit 510. The receiver unit 520 includes a second resonant circuit 522 comprising an inductor L3 and a capacitor C3. The inductor L3 may comprise, for example, a conductor loop or other structure configured to be brought within proximity of the inductor L2 of the transmitter unit 510 to facilitate inductive transfer therebetween. The receiver unit 520 also includes a second AC/DC converter circuit 521 configured to produce a DC output voltage at an output port 502 coupled to a load 20 responsive to an AC voltage induced in the second resonant circuit 522.

As further shown, the receiver unit 520 further includes a communications circuit 523 configured to communicate information representative of this output voltage and/or other states of the receiver unit 520 to a communications circuit 515 in the transmitter unit 510. It will be appreciated that communications between the receiver unit 520 and the transmitter unit 510 may take any of a number of different forms. For example, the communications circuit 523 may transmit an analog signal representative of the output voltage produced at the load 20, and the receiver communications circuit 523 and the transmitter communications circuit 515 may comprise an analog driver and an analog buffer, respectively. In some embodiments, the receiver unit communication circuit 523 may transmit and the transmitter unit communications circuit 515 may receive a digital communications signal representative of the output of the receiver unit 520. Such a digital signal may conform, for example, to an Ethernet or other digital communications protocol. The communications between the transmitter unit 510 and the receiver unit 520 may occur, for example, via a wire, optical link or wirelessly using radio frequency, optical, infrared or other types of wireless signaling. For example, communications between the transmitter unit 510 and the receiver unit 520 may use load shift keying or near-field communications (NFC) conducted over the power transfer circuitry (e.g., via resonant circuits 513, 522) or other circuitry.

It will be appreciated that, in some applications, the transmitter unit 510 may be incorporated in a device such as a charging station for charging battery packs, portable electronic devices, vehicles, lighting devices or the like. The receiver unit 520 may be incorporated in the corresponding device requiring charging, e.g., in a battery pack, portable electronic device, lighting device or the like.

Figure 6:
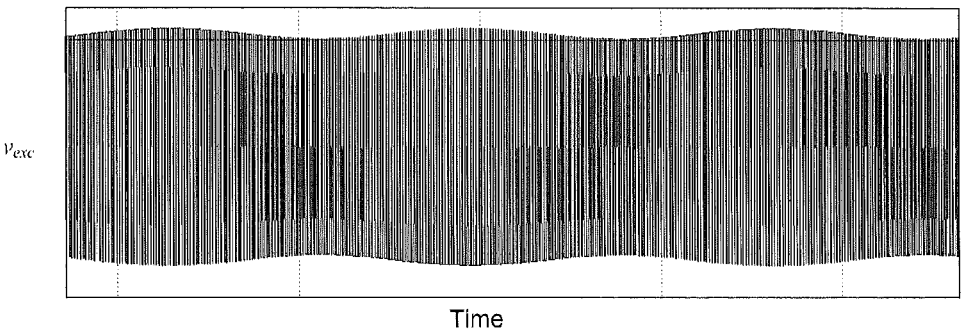
FIGS. 6-9 are waveform diagrams illustrating operations of a wireless power transfer system according to some embodiments.
Figure 7:
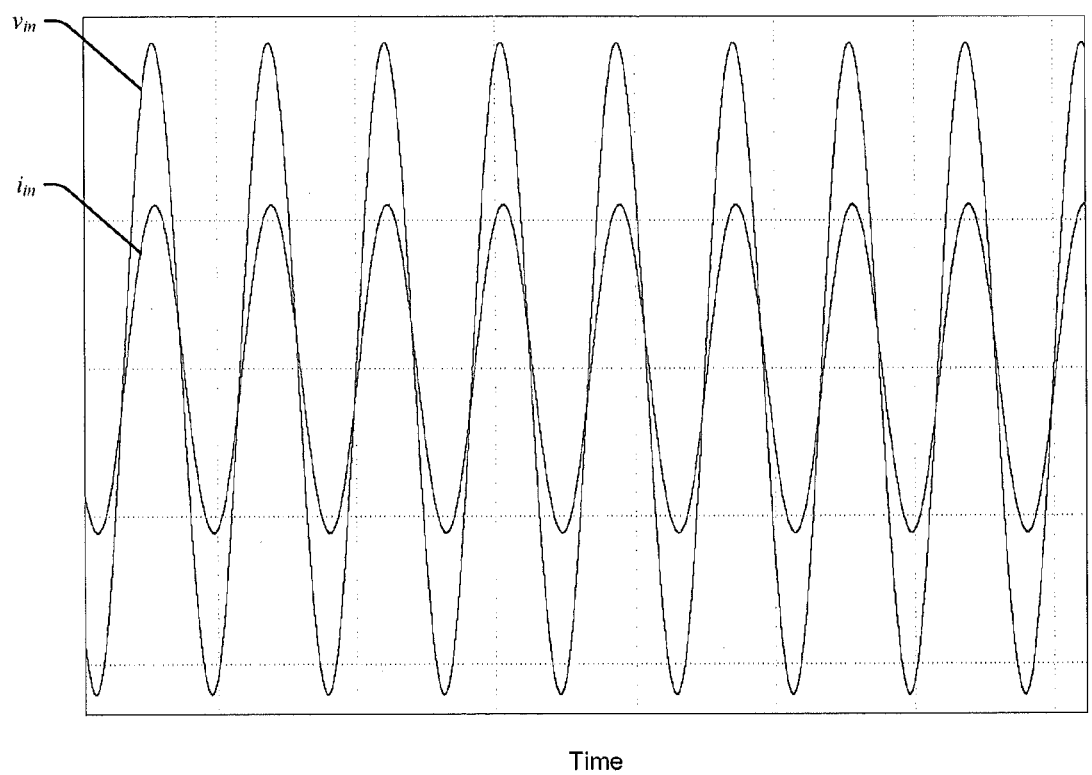
Figure 8:
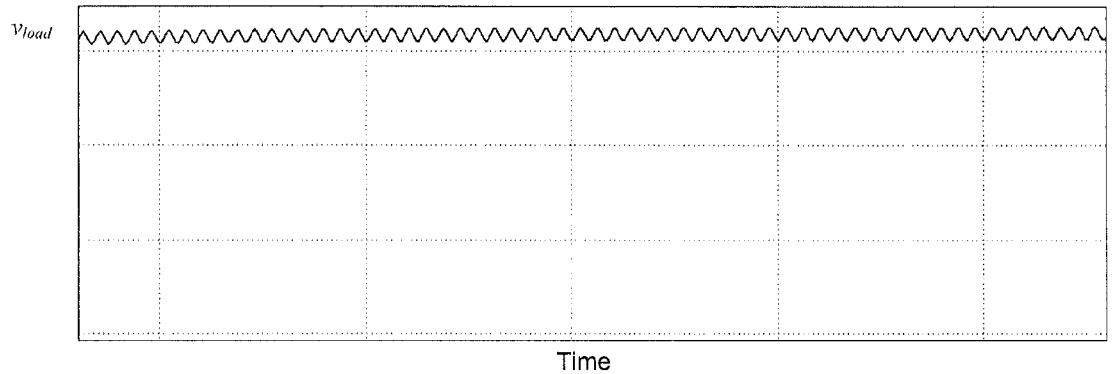
Figure 9:
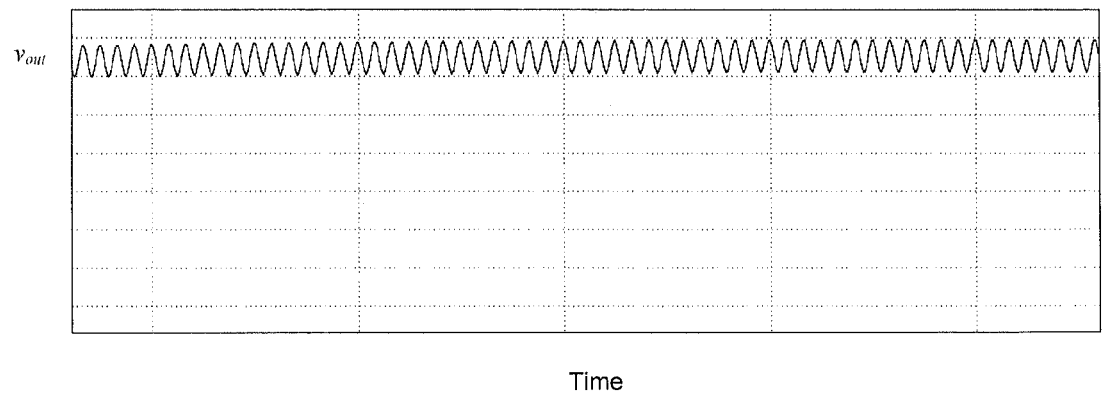

FIGS. 6-9 illustrate example waveforms for a wireless power transfer system along the lines illustrated in FIG. 3 according to some embodiments. Referring to FIG. 6 in conjunction with FIG. 3, the excitation voltage $v_{exc}$ at the input to the active bridge circuit 310 has a relatively high pulse-width modulation frequency. As can be seen, a much lower frequency modulation is superposed upon this voltage due to power factor control operations of the control circuitry, producing the approximately in-phase relationship of the input voltage $v_{in}$ and the input current $i_{in}$ shown in FIG. 7. FIGS. 8 and 9 show the voltage $v_{load}$ produced at the load 20 and the voltage $v_{out}$ produced at the output of active bridge circuit 310, respectively.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A system comprising:
   an AC input port configured to be coupled to an AC power source;
   a first AC/DC converter circuit having a first port coupled to the AC input port;
   a first resonant circuit coupled to the first port of the first AC/DC converter circuit on an AC side of the first AC/DC converter circuit;
   a second resonant circuit inductively coupled to the first resonant circuit;
   a second AC/DC converter circuit coupled to the second resonant circuit; and
   a control circuit configured to control the first AC/DC converter circuit responsive to an output of the second AC/DC converter circuit.

2. The system of claim 1, wherein the first AC/DC converter circuit comprises an H-bridge circuit.

3. The system of claim 2:
   wherein the H-bridge circuit comprises first and second half-bridge circuits, each comprising first and second switches coupled in series between first and second buses; and
   wherein the first resonant circuit is coupled to respective first and second nodes between the first and second switches of respective ones of the first and second half-bridge circuits.

4. The system of claim 3, further comprising at least one inductor coupled between the AC input port and at least one of the first and second nodes.

5. The system of claim 2, wherein the second AC/DC converter circuit comprises a diode bridge circuit.

6. The system of claim 1, wherein the control circuit is configured to control a current at the AC input port responsive to an output produced by the second AC/DC converter circuit.

7. The system of claim 6, wherein the control circuit is further configured to control the current at the AC input port responsive to a voltage at the AC input port.

8. The system of claim 1, further comprising an energy storage circuit coupled to a second port of the first AC/DC converter circuit on a DC side of the first AC/DC converter circuit.

9. The system of claim 1, further comprising a communications circuit configured to transmit a signal representative of the output of the second AC/DC converter circuit and wherein the control circuit is configured to receive the transmitted signal and to control the first AC/DC converter circuit responsive to the received signal.

10. A wireless power transfer apparatus comprising:
    an AC input port configured to be coupled to an AC power source;
    a converter circuit having a first port coupled to the AC input port;
    an energy storage circuit coupled to the converter circuit at a second port of the converter circuit;
    a resonant circuit coupled to the converter circuit at the first port of the converter circuit and configured to inductively transfer power to an external device; and
    a control circuit configured to control the converter circuit responsive to a signal indicative of a state of the external device.

11. The apparatus of claim 10, wherein the converter circuit comprises an AC/DC converter circuit.

12. The apparatus of claim 10, wherein the converter circuit comprises an H-bridge active rectifier circuit.

13. The apparatus of claim 12:
    wherein the H-bridge rectifier circuit comprises first and second half-bridge circuits, each comprising first and second switches coupled in series between first and second buses; and
    wherein the first port of the converter circuit comprises respective first and second nodes between the first and second switches of respective ones of the first and second half-bridge circuits.

14. The apparatus of claim 13, further comprising at least one inductor coupled between the AC input port and at least one of the first and second nodes.

15. The apparatus of claim 10, wherein the control circuit is configured to control a current at the AC input port responsive to a signal indicative of a voltage produced by the external device.

16. The apparatus of claim 15, wherein the control circuit is configured to receive a communications signal representative of the voltage produced by the external device and to control the converter circuit responsive to the received communications signal.

17. The apparatus of claim 15, wherein the control circuit is further configured to control the current at the AC input port responsive to a voltage at the AC input port.

18. The apparatus of claim 10, wherein the resonant circuit comprises a first resonant circuit and wherein the apparatus further comprises a receiver unit having an output configured to be coupled to a load and comprising a second resonant circuit configured to be inductively coupled to the first resonant circuit.

19. The apparatus of claim 18, wherein the converter circuit comprises a first converter circuit and wherein the receiver unit further comprises a second converter circuit coupled to the second resonant circuit and wherein the control circuit is configured to control the first converter circuit responsive to an output of the second converter circuit.

20. The apparatus of claim 19, wherein the control circuit is configured to control a current at the AC input port responsive to an output voltage at the load.

* * * * *